US005486575A

United States Patent [19]

Shroff

[11] Patent Number: 5,486,575
[45] Date of Patent: Jan. 23, 1996

[54] HIGH PERFORMANCE BLOW MOLDING RESINS AND PROCESS FOR THEIR PREPARATION

[75] Inventor: Ramesh N. Shroff, Cincinnati, Ohio

[73] Assignee: Quantum Chemical Corporation, Cincinnati, Ohio

[21] Appl. No.: 208,155

[22] Filed: Mar. 8, 1994

[51] Int. Cl.⁶ .......................... C08F 110/02; C08F 210/02
[52] U.S. Cl. ...................... 525/333.8; 525/387; 264/523
[58] Field of Search ................................. 525/333.8, 387

[56] References Cited

U.S. PATENT DOCUMENTS

| | | |
|---|---|---|
| 2,825,721 | 3/1958 | Hogan et al. . |
| 2,993,882 | 7/1961 | Ashby et al. . |
| 3,642,749 | 2/1972 | Johnson et al. . |
| 3,644,323 | 2/1972 | Norwood et al. . |
| 3,652,214 | 3/1972 | Aboutboul et al. . |
| 3,704,287 | 11/1972 | Johnson . |
| 3,985,676 | 10/1976 | Rekers et al. . |
| 4,025,707 | 5/1977 | Hogan . |
| 4,041,224 | 8/1977 | Hoff et al. . |
| 4,390,666 | 6/1983 | Moriguchi et al. . |
| 4,460,750 | 7/1984 | Thiersault et al. . |
| 4,465,812 | 8/1984 | Moriguchi et al. . |
| 4,508,878 | 4/1985 | Matsuo et al. . |
| 4,578,431 | 3/1986 | Shaw et al. . |
| 4,603,173 | 7/1986 | Mack et al. . |
| 4,614,764 | 9/1986 | Colombo et al. . |
| 4,737,547 | 4/1988 | White . |
| 4,840,096 | 6/1989 | Wild et al. . |
| 4,981,927 | 1/1991 | Rekers et al. . |
| 5,081,089 | 1/1992 | Rekers et al. . |
| 5,198,400 | 3/1993 | Katzen et al. . |

OTHER PUBLICATIONS

Ceria, E., et al., *Journal of Polymer Science, Polymer Letters*, Part B, vol. 1: 371–377 (1963), John Wiley & Sons, Inc.

deKock, R., et al., *Journal of Polymer Science, Polymer Letters*, Part B, vol. 2: 339–341 (1964), John Wiley & Sons, Inc.

Hogan, J. P. et al., "Melt Elasticity in Linear PE Containing Long Branches," *SPE Journal*, pp. 87–90 (Nov., 1967).

*Primary Examiner*—Carman J. Seccuro, Jr.
*Attorney, Agent, or Firm*—Gerald A. Baracka; William A. Heidrich

[57] ABSTRACT

A process is provided to improve the properties of polyethylene resins obtained from chromium catalyzed polymerizations and blow molded bottles produced therefrom. The process entails modifying the polyethylene resin by contacting the resin in a molten state with an organic peroxide at a temperature above the decomposition temperature of peroxide. Polyethylene resins utilized for the process have specific densities, melt indexes, long chain branching indexes, unsaturation contents and molecular weight distributions. Blow molded bottles produced from the modified resins have significantly increased top load stress crack resistance and improved swell characteristics.

14 Claims, No Drawings

HIGH PERFORMANCE BLOW MOLDING RESINS AND PROCESS FOR THEIR PREPARATION

BACKGROUND OF THE INVENTION

1. Field of the Invention

The present invention relates to a process whereby ethylene polymer resins having broad molecular weight distributions obtained from chromium catalyzed polymerizations are improved by modifying with peroxide. By contacting the resins with peroxide, the top load stress crack resistance of blow molded bottles produced therefrom is significantly improved.

2. Description of the Prior Art

In the selection and production of polyethylene resins for the manufacture of blow molded goods, a careful balance must be struck between the physical properties and processing characteristics of the resin if efficient production of durable molded articles is to be achieved. While many ethylene polymers have superior physical properties, they do not have acceptable rheological properties under conditions of flow and shear such as are encountered during the blow molding operation. Conversely, other resins which exhibit satisfactory rheological behavior are deficient in one or more essential physical characteristics. There is a continuing effort to develop resins which have an optimal balance of physical and rheological properties, especially high density polyethylene resins useful for the manufacture of blow molded bottles.

Improvement in the processing characteristics i.e., flow properties and shear response, of high density polyethylene (HDPE) produced using supported chromium catalysts has been obtained by broadening the molecular weight distribution of the polymer. This can be accomplished by blending separately prepared polymers of different molecular weights or by utilizing catalyst systems capable of directly producing polymers having broadened molecular weight distributions.

U.S. Pat. No. 4,025,707, for example, discloses the preparation of high density ethylene homopolymers and copolymers of broadened molecular weight distribution utilizing a mixed catalyst comprised of several portions of the same or different chromium components and metal promoted variations thereof in which the various portions are activated at different temperatures and thereafter combined. Chromium catalysts consisting of a mixture of first and second chromium-containing catalyst components obtained using silica supports of differing pore volumes and wherein one of the catalyst components also contains aluminum and a polymerization process utilizing same to produce HDPE resins having good processability and resistance to environmental stress cracking are disclosed in U.S. Pat. No. 5,081,089. It will also be recognized by those skilled in the art that, for a given supported chromium catalyst, molecular weight distribution can be varied through the use of various co-catalytic agents and modifiers in the polymerization and by varying the support and/or activation conditions used to prepare the catalyst.

While it is possible to broaden molecular weight distribution using chromium catalysts and processes such as those described above, any processing advantages have been accompanied by a corresponding decrease in one or more essential physical properties. For example, while the products obtained in accordance with U.S. Pat. No. 4,025,707 have good swell characteristics and flow properties, densities are generally considered to be too low to provide adequate stiffness for blown bottles. The HDPE polymers obtained using the mixed chromium catalysts of U.S. Pat. No. 5,081,089 have high densities and blow molded bottles produced from these resins have good stiffness, column crush properties (determined by ASTM D 2659-89) and environmental stress crack resistance (determined by ASTM D 2561). However, resistance to stress cracking when the bottles are placed under top load is unsatisfactory.

Environmental stress crack resistance (ESCR) and column crush do not provide a reliable indication of performance of filled blown bottles placed under top load, a condition encountered when bottles are stacked for storage, shipping or display. The Plastic Bottle Institute, a Division of the Society of the Plastics Industry, Inc., has accordingly developed a test to simulate these conditions and determine top load stress crack resistance (TLSCR) of blown polyolefin bottles. The test, identified as PBI 11-1978, Rev. 1-1991, determines resistance to stress cracking under constant top load conditions at elevated temperatures. The purpose of this test is to compare one group of bottles to another of the same design under the same top load and conditions.

It would be highly advantageous if high density polyethylene resins suitable for blow molding produced in chromium catalyzed particle form polymerization processes having an optimal balance of processability and physical properties were available. It would be even more advantageous if bottles produced using the high density resins had improved resistance to stress cracking under top load and if such improvement could be achieved without adversely affecting other essential physical properties and while further improving the processing characteristics of the resin. These and other advantages are achieved with the present invention wherein resins with specified molecular weight distribution, vinyl unsaturation content and long chain branching index are modified by contacting with an organic peroxide and which will be described in greater detail to follow.

Treatment of polyethylene resins with peroxides is known. Peroxides have been widely used to crosslink polyethylene and, in other instances, to "modify" the resins without substantial crosslinking. The latter procedures are generally distinguished from the former in that the modification is accomplished without the formation of gel. They are sometimes referred to in the literature as "lightly crosslinking" or "coupling" to distinguish them from true crosslinking reactions where a substantial amount of material insoluble in boiling xylene is produced.

While the melt index of virtually every polyethylene resin is reduced upon treatment with peroxide, it is not possible to accurately predict what effect such treatment will have on other rheological behavior or on the physical properties of the polymer. Reported results vary significantly from resin to resin even when the resins are produced using similar catalyst technology.

Polyethylene resins produced using Ziegler-Natta catalysts are treated with low levels of free radical initiators in U.S. Pat. No. 4,603,173 to lightly crosslink and thereby improve processing without substantially changing physical properties. The resins used have specific molecular weight characteristics obtained by combining a low molecular weight component with a very high molecular weight component. A reduction in flare swell and die swell is effected without substantially changing weight swell and physical properties.

U.S. Pat. No. 4,390,666 also discloses crosslinking different Ziegler resins to produce a different result. High and medium density polyethylene of high molecular weight and high and medium density polyethylene of low molecular weight are melt blended and lightly crosslinked. Die swell, stiffness, impact and ESCR are improved. Linear medium or low density Ziegler-produced polyethylene is similarly modified by uniformly melt kneading with a low level of radical initiator in the process of U.S. Pat. No. 4,465,812. In yet another reference, U.S. Pat. No. 4,508,878, Ziegler-produced HDPE blow molding resins are pelletized in the presence of peroxide and oxygen to increase die swell and improve surface appearance.

Treatment of polyethylene resins prepared using other catalyst with peroxides is also known and produces widely divergent results. In U.S. Pat. No. 2,993,882 peroxide treatment is employed with polyethylene and ethylene copolymers to decrease the melt index by at least half while the solid state properties of the treated product are essentially unchanged. Copolymers of ethylene and higher alpha-olefin having a density of less than 0.935 are treated with organic peroxides in the process of U.S. Pat. No. 4,460,750 to improve the transparency of films produced therewith but without significantly affecting mechanical properties.

U.S. Pat. No. 4,578,431 discloses improving the melt strength of LLDPE and HDPE film by peroxide treatment without substantially affecting the other desirable film properties.

Ethylene polymer blends wherein the mixture or one of the components in the mixture contains an organic peroxide are disclosed in U.S. Pat. Nos. 4,614,764; 4,737,574 and 4,840,996.

SUMMARY OF THE INVENTION

The present invention is directed to an improvement in a high shear blow molding process for producing bottles from high density ethylene polymers obtained by the particle form homopolymerization of ethylene or copolymerization of ethylene with a $C_{3-8}$ alpha-olefin using a chromium catalyst to increase the top load stress crack resistance of bottles produced therefrom. The improvement comprises contacting a resin having a density from 0.949 to 0.960, melt index from 0.1 to 1.0, long chain branching index less than 1.9, unsaturation content greater than 0.9 vinyl units per 1000 carbon atoms, and $M_w/M_n$ greater than 10 prior to blow molding with 25 to 300 ppm organic peroxide while maintaining the resin in a molten state at a temperature above the decomposition temperature of the organic peroxide.

The invention also provides modified polyethylene resins produced by the above-described process having improved properties such that blow molded bottles produced from said resin have 50 percent or more increased top load stress crack resistance determined in accordance with PBI 11-1978, Rev. 1-1991.

DETAILED DESCRIPTION OF THE INVENTION

The process of the present invention, which produces high density polyethylene blow molding resins having a good balance of processability and physical properties and wherein blow molded bottles produced therefrom exhibit significantly increased TLSCR, entails contacting the resin with an organic peroxide after polymerization and prior to the blow molding operation. As a result of the peroxide modification, swell characteristics of the resin and TLSCR of blown bottles are enhanced without adversely affecting the other desirable processing and physical characteristics of the resin. In some instances, it is also possible to increase the column crush properties of blown bottles produced from the modified resin.

Polyethylene resins modified in accordance with the present invention are high density resins obtained from particle form polymerizations Df ethylene or combination of ethylene and α-olefins using chromium catalysts. The desired resin density will dictate the amount of the α-olefin comonomer used; however, the weight percent of α-olefin copolymerized with the ethylene is generally about 4 weight percent or less. The resins will have densities from 0.949 to 0.960 and melt indexes from 0.1 to 1.0. In a preferred embodiment, for the production of bottles having superior stiffness, a resin of density 0.954 to 0.960 is employed. Resin melt indexes are more preferably in the range from 0.1 to 0.7. Melt indexes referred to herein are determined in accordance with ASTM D 1238-57T at 2160 grams load, 190° C.

The polyethylene resins which are modified necessarily have a broad molecular weight distribution (MWD) and unsaturation content greater than 0.9 terminal vinyl units per 1000 carbon atoms. Polyethylene resins obtained from chromium catalyzed particle form polymerizations which do not have broad MWDs and vinyl unsaturation contents in the specified range either do not produce the increase in TLSCR or, if TLSCR is increased, swell characteristics are rendered unacceptable.

While the broad molecular weight distribution of these resins imparts the desired processability, there is a corresponding increase in swell properties. This phenomena, i.e., increased swell with broadened molecular weight distribution, is known to occur with many polyethylene resins and is believed to be due to the presence of an increased amount of lower molecular weight species. The problems caused by excessive swell during bottle blow molding operations is equally well documented. Among other things, it results in greater retraction of the parison and makes it necessary to utilize (extrude) more resin to achieve the required parison length so that the bottom of the parison may be pinched off to permit blowing. This can also result in parisons with excessive wall thickness or the parison diameter can be increased beyond acceptable limits of flash trimability.

Different measurements are used to measure bottle swell. Weight swell is a measure of the thickness of the bottle swell to that of the die gap. Diameter or flare swell is the ratio of the outside diameter of the parison to the diameter of the die.

As used herein, broad MWD resins are those wherein the ratio of the weight average molecular weight to number average molecular weight ($M_w/M_n$) is greater than about 10. In an especially useful embodiment of the invention $M_w/M_n$ ranges from about 14 to about 18. $M_w$ and $M_n$ are determined using gel permeation chromatography in accordance with known procedures. A Waters Associates GPC 150 operated at 135° C. using 1,2,4-trichlorobenzene as the solvent and three mixed bed ($10^3$–$10^5$ Å), 5μ divinyl benzene JORDI columns with molecular weight resolution in the range $10^3$–$10^7$ was employed. As will be understood by those skilled in the art, the absolute values obtained for $M_w$ and $M_n$ are dependent on the calibration used; however, the relative comparison of ratio of $M_w/M_n$ is widely used throughout the industry.

The resins employed also necessarily have terminal vinyl unsaturation contents greater than about 0.9 per 1000 carbon atoms. More preferably, the unsaturation content will range from 0.9 to 1.4 terminal vinyl units per 1000 carbon atoms. Terminal vinyl unsaturation is determined by infrared spectroscopy using the 910 cm$^{-1}$ band in accordance with the procedures of E. Cernia, C. Mancini and G. Montaudo, *J. Polymer Sci.*, B1, 371–377 (1963) and R. deKock and P. Hol, *J. Polymer Sci.*, B2, 339–341 (1964).

In addition to the specified MWD and terminal vinyl unsaturation, the polyethylene resins have long chain branching indexes less than 1.9 and, more preferably, from 1.4 to 1.8. The long chain branching index is determined in accordance with the principles of J. Hogan, et al., *SPE Journal*, 87–90 (1967) and conforms to the equation, $$LCBI = \eta_o^{0.213}/[\eta]$$

where

LCBI=long chain branching index $\eta_o$=melt viscosity at 190° C. (poise)

$[\eta]$=intrinsic viscosity in 1,2,4-trichlorobenzene at 135° C. (dl/g)

Polyethylene resins meeting the above-described criteria are produced using conventional particle form (slurry) processes for polymerizing ethylene or ethylene copolymers in the presence of a chromium catalyst. Such procedures are well known and described in the prior art, e.g., U.S. Pat. No. 3,644,323. In general the polymerizations are carried out in a liquid organic medium at a temperature from about 150° F. to 230° F. The chromium catalyst is suspended in the organic medium and the reaction is conducted at a pressure sufficient to maintain the organic diluent and at least a portion of the olefin in the liquid phase. The weight percentage of ethylene in the reactor is generally maintained from about 1.5 up to about 7. A small amount of one or more other α-olefins may be included.

Hydrogen is generally added to the polymerization reaction to control molecular weight and other modifiers may be included as well. The molar weight ratio of hydrogen to ethylene in the reactor is generally maintained between 0.25 and 1.0. While not necessary for polymerization, a reducing agent can be included with the chrome catalyst. Organic mediums employed are generally paraffinic and/or cycloparaffinic material such as propane, butane, isobutane, pentane, isopentane, cyclohexane, methylcyclohexane, and the like. The medium is chosen so that under the conditions employed the polymer is insoluble in the medium and is readily recoverable in the form of solid particles. Isobutane is particularly advantageous for these polymerizations. Pressures typically range from about 100 to 800 psig and catalyst concentrations can range from about 0.001 to about 1 percent, based on the total weight of the reactor contents. The polymerizations can be conducted as batch, continuous or semi-continuous operations.

Catalysts employed in these processes are conventional chromium catalysts obtained by depositing a chromium compound onto an inorganic support material having surface hydroxyl groups. Known chromium containing compounds capable of reacting with the surface hydroxyl groups of the support material are employed. The chromium-containing support is generally activated by heating at a temperature above about 450° F. but below the decomposition temperature of the support. The activated supported chromium catalyst is typically combined with a metal and/or non-metal reducing agent, preferably a boron containing compound, for use in the polymerization process.

Inorganic supports which are useful include those normally employed to support catalysts, such as those discussed in U.S. Pat. No. 2,825,721. Typically, these supported materials are inorganic oxides of silica, alumina, silica-alumina mixtures, thoria, zirconia and comparable oxides which are porous, have a medium surface area, and have surface hydroxyl groups. Silica xerogels such as those described in U.S. Pat. No. 3,652,214 which have surface areas in the range of 200 to 500 m$^2$/g and pore volumes greater than about 2.0 cc/g are highly useful.

Chromium compounds which can be used include any chromium containing compound capable of reacting with the surface hydroxyl groups of an inorganic support. Examples of such compounds include chromium trioxide, chromium nitrate, chromate esters such as the hindered di-tertiary polyalicyclic chromate esters, chromium acetate, chromium acetylacetonate, t-butyl chromate, silyl chromate esters and phosphorus containing chromate esters such as are disclosed in U.S. Pat. Nos. 3,642,749 and 3,704,287, organophosphoryl chromium compounds such as are disclosed in U.S. Pat. No. 3,985,676, and organochromium compounds such as chromocene. The latter compounds are the reaction product of chromium trioxide with an organophosphorus compound having the formula:

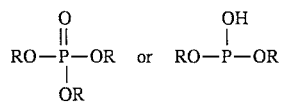

wherein R is alkyl, aralky, aryl, cycloalkyl or hydrogen, but at least one R is other than hydrogen. Trialkyl phosphates, such as triethyl phosphate, are especially useful organophosphorus compounds for this purpose.

Aluminum compounds are commonly included with the chromium compound in the preparation of useful catalysts. Any aluminum compound capable of reacting with the surface hydroxyl groups of the inorganic support material can be used. Highly useful aluminum compounds correspond to the formula:

$$Al(X)_a(Y)_b(Z)_c$$

wherein X is R, Y is OR and Z is H or a halogen; a is 0–3, b is 0–3, c is 0–3, and a+b+c equals 3; and R is an alkyl or aryl group having from one to eight carbon atoms.

Examples of such aluminum compounds include aluminum alkoxides such as aluminum sec-butoxide, aluminum ethoxide, aluminum isopropoxide; alkyl aluminum alkoxides such as ethyl aluminum ethoxide, methyl aluminum propoxide, diethyl aluminum ethoxide, diisobutyl aluminum ethoxide, etc.; alkyl aluminum compounds such as triethyl aluminum; triisobutyl aluminum, etc.; alkyl or aryl aluminum halides such as diethyl aluminum chloride; aryl aluminum compounds such as triphenyl aluminum, aryloxy aluminum compounds such as triphenyl aluminum, aryloxy aluminum compounds such as aluminum phenoxide and mixed aryl, alkyl and aryloxy, alkyl aluminum compounds.

Still other metal components may be incorporated with the chromium compound. For example, compounds which can be utilized to incorporate titanium and zirconium include titanates and zirconates of the formula $$(R)_nMe(OR)_m$$

where Me is titanium or zirconium; R is a hydrocarbon radical selected from alkyl, cycloalkyl, aryl, aralkyl or alkaryl having from 1–12 carbon atoms; m is an integer from 1 to 4, n is an integer from 0 to 3 and m plus n is equal to 4; and titanium or zirconium halides of the formula $$MeX_4$$

where Me is titanium or zirconium and X is chlorine, bromine, fluorine or iodine. Titanium and zirconium compounds represented by the formula

where Me is the same as defined about and $R_1$ is a $C_{1-7}$ alkyl group, for example, tetraethyl titanate, tetraisopropyl titanate, tetraisopropyl zirconate, tetrabutyl titanate, etc., are conveniently deposited on the support by deposition from hydrocarbon solutions. Titanium and zirconium acetylacetonate compounds, such as titanyl acetylacetonate and titanium diacetylacetonate diisopropylate, can also be used to deposit these metals.

Boron is conveniently incorporated utilizing an alkyl ester of boron wherein the alkyl group contains from 1 to 7 carbon atoms, such as trimethyl borate and triisopropyl borate, or a halide or boron.

The above compounds can be deposited on the inorganic support in any suitable manner such as by vapor coating or by impregnating the support with solutions of the metal containing compound. Suitable inert solvents which are normally anhydrous, for solution depositions include aliphatic, cycloalkyl and alkylaryl hydrocarbons and their halogenated derivatives. A preferred organic solvent is dichloromethane. Where the catalyst contains additional metals, the chromium containing compound may be applied to the support first followed by deposition of the other metal compound(s) or the chromium and metal compound(s) may be applied together.

The catalysts can contain from about 0.25 to 4 weight percent chromium; however, more typically Cr contents will range from 0.5 to 2.5 weight percent. Aluminum contents can range from 0.1 to 10% by weight but, more preferably, will be from about 0.5 to 5 weight percent. Any additional metal or non-metal catalytic agents will typically be used in amounts such that the metal/non-metal content is from 0.1 to 6 weight percent.

After the chromium compound and optional additional metal and non-metal compounds have been deposited on the inorganic support, the support is heated in a non-reducing atmosphere, preferably in an oxygen containing atmosphere, at a temperature above about 450° F. The temperature should not, however, exceed the decomposition temperature of the support. Typically, this heat activation procedure is carried out at temperatures from 450° F. to 1700° F. in dried (less than 2–3 ppm water) air. The heating time may vary depending on the temperatures used but generally is for a period of 2 to 12 hours.

Prior to the above-described thermal activation, it is also possible to reductively treat the catalyst component(s) in accordance with procedures such as those described in U.S. Pat. No. 4,041,224. Such treatment entails heating at a temperature from about 575° F. to 1650° F. in a reducing atmosphere for a period of time which can range from several minutes up to several hours. Preferably, the reducing atmosphere consists of a mixture of inert gas with a reducing gas, such as mixtures of nitrogen and carbon monoxide. Heating in the reducing atmosphere is preferably conducted at temperatures from about 1000° F. to 1400° F. When the catalyst component is first heated in a reducing atmosphere, the subsequent heat activation in a non-reducing atmosphere is usually carried out from 800° F. to 1100° F.

Two or more catalyst components prepared in accordance with the above-described procedures may be combined to provide useful catalysts for the particle form polymerization of ethylene. In other words, discreet supported catalyst components independently prepared can be combined in defined ratios to provide so-called "mixed catalysts." The discreet catalyst components used may all contain chromium but this is not necessary as long as one of the components is chromium based. Similarly, the catalyst components may contain different levels of chromium and may contain one or more different metallic or non-metallic catalytic agents which can be the same or different and present in varying amounts. Furthermore, the supports used for preparation of the catalyst components may be different and the catalyst components may be activated under different conditions. The possible variations to provide useful mixed catalysts for ethylene polymerizations are numerous. Mixed catalysts useful for the preparation of broad MWD polyethylene resins of the type modified by the present invention are described in U.S. Pat. Nos. 4,981,927; 5,081,089 and 5,198,400.

The heat-activated supported catalyst component(s) can be used by themselves for the polymerization of ethylene or, as is more commonly the case, combined with a metallic and/or non-metallic reducing agents for the polymerization. Examples of metallic reducing agents include trialkyl aluminums, such as triethyl aluminum, triisobutyl aluminum, alkyl aluminum halides, alkyl aluminum alkoxides, dialkyl zinc, dialkyl magnesium, and metal borohydrides including those of the alkali metals, especially sodium, lithium and potassium, and of magnesium, beryllium and aluminum. Non-metallic reducing agents include alkyl boranes such as triethyl borane, triisobutyl borane, and trimethyl borane and hydrides of boron such as diborane, pentaborane, hexaborane and decaborane. The amount of metallic or non-metallic reducing agent used can vary widely.

Using chromium catalysts of the above types for the polymerization of ethylene in particle for processes, resins having the requisite density, melt index (MI), $M_w/M_n$, terminal vinyl unsaturation content and LCBI and which can be modified in accordance with the invention to improve the swell characteristics of blown bottles produced therefrom can be produced. It will be understood by those skilled in the art that polymerization conditions will be selected depending on the particular chromium catalyst used to produce a resin with the desired balance of the aforementioned characteristics considered to be optimal for the bottle blow molding application involved.

It will be understood by those skilled in the art that mixtures of two or more polyethylene resins produced in accordance with any of the above-described procedures can be used to produce a blend meeting the above requirements and which can be peroxide modified by the process of the present invention. Furthermore, polyethylene resins produced by other polymerization methods can also be used. For example, gas phase polymerizations which utilize stirred, fixed beds comprised of small polymer particles can be used with any of the above-identified high activity chromium catalysts. These polymerizations which are carried out in the substantial absence of a liquid reaction medium and wherein the gas velocity within the stirred bed is maintained below the onset of fluidization, using spiral agitators to maintain a turbulent mechanically fluidized bed of polymer powder are known and described in the prior art.

For the modification, the polyethylene resin is contacted with from 25 to 300 ppm organic peroxide while maintaining the resin in the molten state. The contacting temperature will be above the decomposition temperature of the organic peroxide but below the temperature where significant decomposition of the resin occurs. The temperature will accordingly range from about 150° C. to about 260° C. and, more preferably, from 180° C. to 240° C. In a particularly useful embodiment of the invention, the resin is contacted with about 75 to about 200 ppm of the organic peroxide.

Contact times are not critical so long as sufficient time is provided for the organic free radical moieties generated when the organic peroxide decomposes to be substantially uniformly distributed throughout the resin melt and essentially completely consumed. This, of course, will to a large extent depend on the particular resin used, the temperature at which the operation is carried out and the mixing efficiency. In general, contact times will range from about 0.5 to about 5 mins. Contact times and temperatures above those specified are of no benefit and may, in fact, be detrimental and produce undesirable gel particles.

Organic peroxides employed in the instant invention are any of the commonly employed and commercially available organic peroxides disclosed in the prior art and having decomposition temperatures within the requisite range. Suitable peroxides of this type include, for example, di-t-butyl peroxide; dicumyl peroxide; 2,5-dimethyl-2,5-di(t-butylperoxy)-hexane; 2,5-dimethyl-2,5-di-(t-butylperoxy)-hexyne-3; butyl-4,4-bis-(t-butylperoxyvalerate); cumyl hydro-peroxide; 1,1-bis-(t-butylperoxy)- 3,3,5-trimethylcyclohexane; 1,3-di-(t-butylperoxy)di-isopropylbenzene; benzoyl peroxide; t-butyl hydroperoxide; t-butyl peroxybenzoate; cumene hydro-peroxide; lauroyl peroxide; t-butyl peroxy acetate; t-butyl peroxide methyl ethyl ketone peroxide; t-butyl cumyl peroxide; and (t-butylperoxy)-butyrate. Dicumyl peroxide; 2,5-dimethyl-2,5-di(t-butylperoxy)hexane; t-butyl cumyl peroxide; di-t-butyl peroxide and 2,5-dimethyl-2,5-di(t-butylperoxy)hexyne-3 are particularly useful for the process of the invention.

The organic peroxides may be in the liquid or solid form. When liquids are employed, the peroxide may be advantageously adsorbed onto an organic or inorganic substrate to facilitate handling and incorporation into the polyethylene resin. In one useful embodiment, the organic peroxide is adsorbed on a polyethylene resin of the type to be modified. The amount of peroxide absorbed can be significantly higher than required for the modification so that the polymer with the adsorbed peroxide can be used as a concentrate for let down into the final resin. Products wherein the peroxide is adsorbed on a filler, such as a clay or $CaCO_3$, are also commercially available and can also be used in the process.

The organic peroxide can be combined with a solid (unmolten) polyethylene resin and the mixture subsequently melted or the organic peroxide may be directly introduced into a polyethylene resin melt. It is thus possible with the process of the invention, to modify previously manufactured polyethylene polymers or to include the modification as part of the post-polymerization processing operation.

In either event, the polyethylene resin and organic peroxide are intimately contacted by melt mixing above the decomposition temperature of the organic peroxide using conventional mixers such as a Banbury mixer, Henschel mixer or extruder. Single or twin-screw extruders or combination mixer-extruders can be used and are particularly advantageous for continuous operation. The modified resin may be directly used for blow molding or the resin may be recovered, stored and subsequently used. If the resin is to be used directly, the peroxide may be introduced to and modification accomplished in the blow molding extruder used to produce the parison or a second in-line/mixer extruder may be used.

Polyethylene resins which are contacted with an organic peroxide in the melt in accordance with the above-described procedure can be utilized in conventional blow molding operations. They are particularly useful for the formation of blow molded bottles and, in view of their balance of processability and physical properties, especially useful for the production of larger size blow molded bottles, such as pint, quart, and gallon containers, e.g., one gallon milk or bleach jugs. As previously indicated, bottles produced using the modified resins have significantly improved TLSCR and swell characteristics compared to unmodified precursor resin. This is surprising since the density, $M_w/M_n$ and terminal vinyl unsaturation content of the modified resin is essentially unchanged from that of the precursor resin. Swell characteristics of the resin and TLSCR are enhanced without adversely affecting the processability or other physical properties. The increase in TLSCR obtained with blow molded bottles produced using the modified resins of the invention is generally about 50 percent or more (compared to bottles blown from the unmodified resin). In some instances, TLSCR increases of 300 percent or more are achieved upon modification. Also, by such modification significant reductions in weight and diameter swell are obtained. Furthermore, it is observed that peroxide modification introduces no undesirable gel particles in the modified resin. In some instances there is also an increase in the column crush properties of the bottles.

The above results are particularly significant since the improvement in TLSCR and swell characteristics is only obtained using a polyethylene having a broad molecular weight distribution, i.e., $M_w/M_n$ greater than about 10, and terminal vinyl unsaturation content greater than about 0.9. Polyethylene resins produced in particle form polymerizations using chromium catalysts which do not have the specified MWDs and vinyl unsaturation contents do not produce bottles with increased TLSCR or, if TLSCR is increased, swell characteristics are unacceptable. Similarly, it is observed that improvement in bottle TLSCR is not possible by peroxide modification of polyethylene resins produced using Ziegler-Natta catalysts.

Various aspects of the invention are described in greater detail in the examples which follow. These examples are for illustrative purposes only and are not intended to limit the scope of the invention. Numerous variations are possible without deviating from the spirit and scope of the invention and will be apparent to those skilled in the art.

In the examples the MI, $M_w/M_n$, terminal vinyl unsaturation content per 1000 carbon atoms and LCBI were determined in accordance with the previously described procedures.

TLSCR evaluations were performed using 16 oz. blow molded Boston round bottles in accordance with the procedure described in PBI 11-1978, Rev. 1-1991. Bottles were tested using a 10% Igepal$^{SM}$ solution at 15 pounds load and 50° C. Column crush evaluations, when performed, were made using 16 oz. Boston round bottles in accordance with ASTM D-2659-89. The bottles were produced using a reciprocating IMPCO A135 blow molder operated at a screw speed of 65 rpm and blow pressure of 60 psi with the following temperature settings:

| | |
|---|---|
| Rear screw | 177° C. |
| Front screw | 203° C. |
| Head | 190° C. |
| Die | 196° C. |

The actual melt temperature was 196° C. Total cycle time was 17.2 seconds and parison drop time was 2.5 seconds. Bottle weights were 25 grams.

Bottle swell properties were determined using one gallon bleach-type bottles produced using a reciprocating Uniloy 5630 (single head) blow molder with the following heat settings:

| | |
|---|---|
| Feed | 166° C. |
| Transition | 177° C. |
| Meter 1 | 190° C. |
| Meter 2 | 190° C. |
| Head | 190° C. |
| Die | 190° C. |

The melt temperature under these conditions was 193° C. Screw speed was maintained at 26 rpm and the total cycle time was 15.4 seconds (10 seconds blow and 1.5 seconds parison drop).

A diverging type annular die was used to form the parison and produce the one gallon bottles. To determine weight swell ($U_w$) and diameter swell ($U_D$), the die gap and mold position were first adjusted using a standard commercially available high density polyethylene blow molding resin to produce a bottle weight of 90 grams and diameter swell of 8 centimeters. Diameter swell represents the distance in centimeters the flash extends down the handle area. The modified resin to be evaluated is then run and the deviation from the 90 gram bottle weight is determined and reported as Uw. Deviation of ±5 grams is considered to be acceptable variation for $U_w$. The die gap is then adjusted to produce 90 gram bottles with the modified resin being evaluated and diameter swell (sometimes also referred to as flare swell) determined. Diameter swell in the range 7 to 9 cm. is considered to be acceptable. Values for $U_D$ greater than 9 cm. produce undesirable amounts of flash and, if excessive, can present trimability problems. $U_D$ values less than 7 cm. can produce handle webbing and in extreme cases result in a "blowout" or hole in the handle.

EXAMPLE I

A high density polyethylene blow molding resin produced by the particle form polymerization of ethylene in a circulating loop-type reactor with turbulent flow using a mixed chromium catalyst of the type described in U.S. Pat. No. 5,081,089 was modified in accordance with the process of the invention. Density, MI, $M_w/M_n$, LCBI and the terminal unsaturation content of the resin are set forth in Table I.

For the peroxide modification in accordance with improved process of the invention, pellets of the resin were tumble-blended at room temperature with 150 ppm organic peroxide (2,5-dimethyl-2,5-di(t-butylperoxy)hexane, LUPERSOL™ 101, Elf Atochem North America, Inc.). The pellets having the peroxide adsorbed thereon were then processed in a PRODEX single screw compounding extruder to melt the resin and decompose the peroxide while in intimate contact with the molten resin. Operating conditions within the mixer/extruder were as follows:

| | |
|---|---|
| Zone 1 | 185–190° C. |
| Zone 2 | 185–190° C. |
| Zone 3 | 176–178° C. |
| Zone 4 | 192–199° C. |
| Zone 5 | 213–221° C. |
| Die 1 | 210–224° C. |
| Die 2 | 198–210° C. |
| Screw RPM | 93–95 |
| Melt Temperature | 215–218° C. |

Whereas 16 oz. Boston round bottles blown from the original (unmodified) polyethylene resin had a TLSCR of only 11 hours, bottles produced using the peroxide modified resins of the invention had a TLSCR of 34 hours. In addition to the more than three-fold increase in TLSCR, column crush of the bottles produced from the modified resins was increased (69 compared to 65 for bottles produced from the unmodified polyethylene). While one gallon bottles were not blown from the modified resin produced above, one gallon bottles were blown from the identical polyethylene resin moldified in the above manner with 125 ppm and 175 ppm organic peroxide and $U_w$ and $U_D$ determined and found to be within acceptable limits. Based on the values obtained for the bottles produced from the resins modified with 125 ppm and 175 ppm peroxide, extrapolated values for $U_w$ and $U_D$ were determined for bottles blown from polyethylene resin modified with 150 ppm peroxide. These values were −3.6 grams and 8.6 cm., respectively.

COMPARATIVE EXAMPLE A

To demonstrate the unexpectedness of above improvements a commercially available high density polyethylene blow molding resin produced using a chromium catalyst was identically modified as described in Example I. The comparative resin referred to as CE A, had an MI and density within the specified range but the molecular weight distribution, LCBI and unsaturation content were outside the required ranges. The product is fully characterized in Table I. When the resin was modified using 150 ppm of the same organic peroxide utilized in Example I, an increase in TLSCR was observed; however, the swell characteristics of the resin were rendered unacceptable. Upon peroxide modification, the weight swell ($U_w$) of the blown bottle was decreased to an unacceptable −11.6 grams (from +6.7 grams) and the diameter swell ($U_D$) was lowered from an acceptable 8.2 cm to an unacceptable 6.5 cm. At this low swell, a bottle defect in the form of a fold at the lower end of the handle was observed.

COMPARATIVE EXAMPLE B

To further demonstrate the inability to achieve improvement in TLSCR and acceptable swell characteristics using polyethylene resins outside the scope of the invention, a commercially available high density polyethylene blow molding resin produced using a chromium catalyst was modified with peroxide in accordance with the procedure of Example I. The comparative resin, referred to as CE B, had a melt index, density and terminal unsaturation content within the specified range but the molecular weight distribution and LCBI were outside the required ranges. The resin is fully characterized in Table I. When the resin was modified as described in Example I, except that 135 ppm organic peroxide (LUPERCO™ 101-XL, 2,5-dimethyl-2,5-di(t-butylperoxy)hexane) on calcium carbonate) was used, the TLSCR was decreased from 95 to 92 hours. Furthermore, $U_w$ was reduced from an acceptable −3 grams to an unacceptable −14 grams and $U_D$ was reduced from an acceptable 8.2 cm to an unacceptable 6.9 cm and handle webbing was observed.

EXAMPLE II

The ability to utilize other polyethylene resins and to vary the amount and type of organic peroxide and modification procedure are illustrated by the present example. The density, MI, $M_w/M_n$, LCBI and terminal unsaturation content of polyethylene resin used are set forth in Table I. For this example, three different levels of organic peroxide ranging from 135 ppm to 200 ppm were used. The organic peroxide was LUPERCO™ 101-XL, a free-flowing powder having 45–48% of the active ingredient (2,5-dimethyl-2,5-di(t-butylperoxy)hexane adsorbed on calcium carbonate. Peroxide modification was accomplished as part of the polymer finishing operation in a continuous mixer and extruder-pelletizer. The organic peroxide was continuously metered into the mixer along with 605–1150 ppm antioxidant and intimately mixed with the molten resin and then extruded and pelletized. TLSCR, column crush, $U_w$ and $U_D$ for bottles produced in the usual manner from the unmodified and modified resins were as follows:

|  | TLSCR | COLUMN CRUSH | $U_w$ | $U_D$ |
| --- | --- | --- | --- | --- |
| Unmodified resin | 22 hrs | 64 lbs | +9 g | 12 cm |
| Modified resin (135 ppm peroxide) | 66 hrs | 66 lbs | −2.5 g | 8.8 cm |
| Modified resin (150 ppm peroxide) | 61 hrs | 68 lbs | −6 g | 7.9 cm |
| Modified resin (200 ppm peroxide) | 122 hrs | 66 lbs | −7 g | 7.5 cm |

It is apparent from the above results that there was a significant increase in TLSCR and column crush was improved in all instances when the polyethylene resin was modified with the organic peroxide. Furthermore, diameter swell of the resin was brought within acceptable limits by such modification. While the higher levels of peroxides, i.e., 150 and 200 ppm, produced larger than desired reduction in weight swell, $U_w$ of the resin modified with 135 ppm peroxide was decreased to within acceptable limits.

Sixteen (16) ounce Boston round bottles were also blown from resins modified as described above using a 2-inch BECKUM continuous blow molder. Melt temperature of the extruded resin used to produce the 25 gm bottles was about 199° C. Blow molded bottles produced from the resins modified with 150 and 200 ppm peroxide were evaluated for column crush only. The respective column crush values were 72.9 and 75.3 pounds compared to 62.6 pounds for the unmodified resin.

TABLE I

| POLY-ETHYLENE RESIN | DENSITY | MI | $M_w/M_n$ | LCBI | TERMINAL UNSAT-URATION |
| --- | --- | --- | --- | --- | --- |
| I | 0.957–0.958 | 0.27 | 15 | 1.7 | 1.06[1] |
| CE A | 0.952 | 0.33 | 6.2 | 2.3 | 0.84 |
| CE B | 0.954 | 0.35 | 7.0 | 2.0 | 1.04 |
| II | 0.957 | 0.36 | 16 | 1.5 | 1.35 |

[1]Average of three determinations

EXAMPLE III

To further demonstrate the process of the invention and its adaptability to continuous operation, the peroxide modification was conducted in conjunction with the preparation of a commercial high density polyethylene resin meeting the MI, density, $M_w/M_n$, LCBI and terminal unsaturation requirements of the invention. The in-line addition of the organic peroxide was made by introducing the peroxide and antioxidant to a continuous mixer wherein the peroxide was intimately contacted with the resin melt and decomposed and fed to an extruder-pelletizer for further mixing and production of the pelletized product. The organic peroxide, LUPERCO™ 101-XL, was used at a 150 ppm level. Two different lots of the resulting modified polyethylene pellets were used to blow mold one gallon bleach bottles. The first lot (density 0.951, MI 0.16) produced bottles having a TLSCR of 450 hours and column crush of 59 pounds. The second lot (density 0.952, MI 0.12) had a TLSCR of 310 hours and column crush of 59 pounds.

COMPARATIVE EXAMPLE C

To further demonstrate the applicability of the modification only to specific polyethylene resins produced in chromium catalyzed polymerizations and having specified density, MI, $M_w/M_n$, LCBI and vinyl unsaturation requirements, the following comparative example is provided. For this comparison, a commercial blow molding resin produced using a Ziegler Natta catalyst was modified in accordance with the process of the invention. The polyethylene resin, Exxon 9856, had a melt index 0.41, density 0.956, $M_w/M_n$ 19, LCBI 1.2 and 0.110 terminal vinyl unsaturation per 1000 carbon atoms. The resin met all of the requirements of Applicant's resins except for the vinyl unsaturation which is below Applicant's specified limit since the resin was produced using a Ziegler catalyst rather than a chromium catalyst. In accordance with the previously described procedures, one gallon and 16 ounce bottles were blown from the resin and evaluated for TLSCR, column crush, weight and diameter swell. Blow molded one gallon bottles produced from the unmodified polyethylene resin had TLSCR of 364 hours and column crush of 61.5 pounds. Weight swell ($U_w$) obtained for the one gallon blow molded bottles was −1.4 and diameter swell ($U_D$) was 12 cm.

A sample of the polyethylene resin was modified following the procedure of Example I with 135 ppm organic peroxide (LUPERCO™ 101-XL) and bottles were blown from the peroxide modified resin. Both the TLSCR and column crush properties were significantly reduced by peroxide modifying the resin. The TLSCR was reduced to 295 hours. Column crush was lowered to 58.1 pounds. The value for $U_w$ was also decreased to −7 gm, a value generally regarded as outside acceptable limits. $U_D$ for the one gallon blow molded bottles produced with the modified resin was 8 cm and within the acceptable range.

The above results clearly demonstrate that peroxide modification of comparable Ziegler-produced polyethylene resins in accordance with the invention does not produce the desired increase in bottle properties and further demonstrates the unobviousness of the invention.

COMPARATIVE EXAMPLE D

In yet another experiment to demonstrate the unobviousness of the results obtained by the modification process of the invention, a commercial polyethylene blow molding resin produced using a Ziegler Natta catalyst (OXY 5840 AS) having a melt index 0.43, density 0.958, $M_w/M_n$ 12, LCBI 1.3 and terminal unsaturation 0.092 was evaluated before and after peroxide modification. Whereas bottles blown from the unmodified resin had TLSCR of 48 hours and column crush of 60 pounds. The resin modified with a 150 ppm organic peroxide (LUPERSOL™ 101) in accordance with the above-described procedures had a TLSCR of 42 and column crush of 62 pounds. It is apparent from the foregoing that while the column crush was slightly increased, TLSCR was decreased by such treatment. Furthermore, $U_D$ for the bottles molded from the unmodified resin was +12 and brought to within acceptable limits 8.0 by such treatment. $U_w$, on the other hand, by such peroxide modification was taken outside the acceptable range. The value for the bottles molded with the modified resin was −6.8 gm whereas it was originally +4.6 gm with the unmodified base resin.

I claim:

1. In a high shear blow molding process for producing bottles from high density ethylene polymers obtained by the particle form homopolymerization of ethylene or copolymerization of ethylene with a $C_{3-8}$ alpha-olefin using a chromium catalyst and having a density from 0.949 to 0.960, melt index from 0.1 to 1.0, long chain branching index less than 1.9, unsaturation content greater than 0.9 vinyl units per 1000 carbon atoms, and $M_w/M_n$ greater than 10, to increase the top load stress crack resistance and swell characteristics of bottles produced therefrom, the improvement comprising contacting the resin prior to blow molding with 25 to 300 ppm organic peroxide while maintaining the resin in a molten state at a temperature above the decomposition temperature of the organic peroxide.

2. The process of claim 1 wherein the ethylene polymer has a density from 0.954 to 0.960 and melt index from 0.1 to 0.7.

3. The process of claim 1 wherein $M_w/M_n$ of the ethylene polymer is from about 14 to 18.

4. The process of claim 1 wherein the unsaturation content of the ethylene polymer is from about 0.9 to 1.4 terminal vinyl groups per 1000 carbon atoms.

5. The process of claim 1 wherein the long chain branching index of the ethylene polymer is from about 1.4 to 1.8.

6. The process of claim 1 wherein the ethylene polymer and organic peroxide are contacted at a temperature from about 150° C. to about 260° C.

7. The process of claim 6 wherein the organic peroxide is present in an amount from about 75 to about 200 ppm and is selected from the group consisting of dicumyl peroxide; 2,5-dimethyl-2,5-di(t-butylperoxy)hexane; t-butyl cumyl peroxide; di-t-butyl peroxide and 2,5-dimethyl-2,5-di(t-butylperoxy)hexyne-3.

8. The process of claim 7 wherein the organic peroxide is a liquid.

9. The process of claim 7 wherein the organic peroxide is adsorbed on an organic or inorganic substrate.

10. The process of claim 7 wherein the ethylene polymer is a copolymer of ethylene with less than 4 percent $C_{3-8}$ α-olefin.

11. The process of claim 7 wherein the ethylene polymer and organic peroxide are contacted at a temperature from about 180° C. to 240° C.

12. The process of claim 11 wherein the ethylene polymer and organic peroxide are contacted by mixing in an extruder.

13. The process of claim 12 wherein the organic peroxide is 2,5-dimethyl-2,5-di(t-butylperoxy)hexane.

14. A blow molded bottle produced by the process of claim 1 wherein the top load stress crack resistance, determined in accordance with PBI 11-178, Rev. 1-1991, is increased 50 percent or more compared to bottles produced using unmodified resin.

* * * * *